US009912183B2

(12) United States Patent
Kokot, Jr. et al.

(10) Patent No.: US 9,912,183 B2
(45) Date of Patent: Mar. 6, 2018

(54) JUMP STARTER

(71) Applicant: VanAir Manufacturing, Inc., Michigan City, IN (US)

(72) Inventors: Ralph Kokot, Jr., Crown Point, IN (US); Kai Justice, Wheatfield, IN (US); Mark Alan Firnhaber, LaPorte, IN (US); John D. Graun, Hobart, IN (US); James Aaron Morton, Westville, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 137 days.

(21) Appl. No.: 15/067,704

(22) Filed: Mar. 11, 2016

(65) Prior Publication Data

US 2016/0329731 A1 Nov. 10, 2016

Related U.S. Application Data

(60) Provisional application No. 62/133,124, filed on Mar. 13, 2015.

(51) Int. Cl.
| | |
|---|---|
| *H02J 7/00* | (2006.01) |
| *B60L 11/18* | (2006.01) |
| *B60L 11/00* | (2006.01) |
| *H02J 7/32* | (2006.01) |
| *H02J 7/34* | (2006.01) |
| *H02J 1/00* | (2006.01) |

(52) U.S. Cl.
CPC ........... *H02J 7/0054* (2013.01); *B60L 11/005* (2013.01); *B60L 11/1818* (2013.01); *H02J 7/32* (2013.01); *H02J 7/345* (2013.01); *H02J 7/0036* (2013.01); *H02J 7/0047* (2013.01); *H02J 2001/006* (2013.01); *H02J 2001/008* (2013.01)

(58) Field of Classification Search
CPC ................ B60L 11/005; B60L 11/1818; H02J 2001/006; H02J 2001/008; H02J 7/0036; H02J 7/0047; H02J 7/0054; H02J 7/32; H02J 7/345
See application file for complete search history.

(56) References Cited

U.S. PATENT DOCUMENTS

| | | | |
|---|---|---|---|
| 2002/0041174 A1* | 4/2002 | Purkey ..................... | F02N 11/14 320/103 |
| 2009/0008374 A1* | 1/2009 | Fosbinder ............ | B23K 9/1006 219/130.21 |
| 2013/0154543 A1* | 6/2013 | Richardson ............. | H02J 7/007 320/104 |

* cited by examiner

*Primary Examiner* — Vuthe Siek
(74) *Attorney, Agent, or Firm* — R. Tracy Crump (57) ABSTRACT

A jump starter unit for starting large vehicles and other equipment using jumper cable at lengths up to fifty (50) feet. The jump starter includes a high output (200-300 amp) alternator and a large (2000 Farad) capacitor. The alternator is also used to maintain the capacitor's charge when the boost charge is not needed. The alternator and capacitor are integrated into an electrical system that includes an electronic control and a plurality of relays that provide the various charging and boost functions of the unit. In certain embodiments, the jump starter unit may take the form of a portable or mobile self contained apparatus having its own combustion to drive the high output alternator. In other embodiments, the jump starter unit may be integrated into a service vehicle, such as a tow truck or utility vehicle, and utilize the vehicle's engine to drive the jump starter's high output alternator.

19 Claims, 4 Drawing Sheets

Fig. 4 ated to use long jumper cables for starting large vehicle engines with high inertial loads, such as very large gasoline and diesel engines.

JUMP STARTER

This application claims the benefit of U.S. Provisional Application No. 62/133,124 filed Mar. 13, 2015, the disclosure of which is hereby incorporated by reference.

This invention relates to jump starters used to start the combustion engines of vehicles and other equipment, and in particular a mobile jump starter adapted to use long jumper cables for starting large vehicle engines with high inertial loads, such as very large gasoline and diesel engines.

BACKGROUND OF INVENTION

Battery chargers and jump starters are commonly used to "jump start" or "boost start" the internal combustion engines of vehicles and other equipment. Chargers and jump starters are connected to the vehicle's battery by electrical cables that provide a boost of electrical power to start the vehicle. Chargers and jump starters are often powered by AC line power or DC generators.

Battery chargers are designed to recharge drained batteries, but many chargers have a "boost" or "engine start" assist feature, which provides some additional electrical power to assist in starting a vehicle. Despite being able to assist in starting a vehicle, these types of battery chargers perform their task over a longer period of time, rather than an instantaneous boost. Using their "boost" mode, an AC battery charger may take five to twenty minutes to "boost" a dead battery depending on the depth-of-discharge (DOD), health of the vehicle battery, and type of engine (engine displacement).

Jump starters are devices specifically designed to jump start a dead vehicle using jumper cables in the place of an additional running vehicle. Jump starters are often standard equipment for tow trucks and road side assistance vehicles. Jump starters may take the form of a portable unit or be integrated into the vehicles equipment and electrical package. Jump starters are typically portable devices that are battery or AC powered. Often jump starters use large 200 plus amp capacitors to provide the surge or "boost" of electrical power needed to start the vehicle. Capacitor boosted jump starters are often used to start vehicles with large gasoline and diesel engines that have high inertial starting loads. While providing the additional starting "boost" of electrical power, capacitors must be recharged after every start attempt. Typically, the capacitors of jump starters are charged and recharged using AC line power or the DC power system of a host or other vehicle.

In addition, both battery chargers and jump starters are limited, heretofore by the length of the jumper cables. Even with large capacitors (200 plus amp), conventional jump starters have been ineffective at starting large engine vehicles with jumper cables longer than nine to ten feet. The resistance in the jumper cable at lengths greater than nine feet (9') is too much for the jump starter's capacitors to overcome. Although the capacitors have a great amount of stored electrical energy, they have a relatively low amount of available electrical power. The electrical power from the jump starter is quickly dissipated through the resistance of the jumper cables' wire. Wire rated at 0.053 ohms/1000 ft, such as standard 3/0 electric power cables, is unable to carry the power discharged by the capacitor and deliver it in a usable state at a length over nine to ten feet. This short cable length is a significant disadvantage for applications, such as road side assistance. Even with portable jump starters, the location or position of the vehicle to be started requires a length of jumper cables that robs needed cranking power from the jump starter.

SUMMARY OF INVENTION

This invention provides an apparatus ("jump starter") for starting large vehicles (trucks and other equipment) using jumper cable at lengths up to fifty (50) feet. Each embodiment of the jump starters of this invention includes a high output (200-300 amp) alternator and a "super" capacitor a "super" capacitor (a capacitor having capacitance of at least 2000 farads and 120 kilo-joule at 12 volts or 500 Farads and 120 kilo-joules at 24 volts). The alternator is also used to maintain the capacitor's charge when the boost charge is not needed. The alternator and capacitor are integrated into an electrical system that includes an electronic control and a plurality of relays that provide the various charging and boost functions of the starter unit. In certain embodiments, the jump starter unit may take the form or a portable or mobile self contained apparatus having its own combustion engine to drive the high output alternator. In other embodiments, the jump starter may be integrated into a service vehicle, such as a tow truck or utility vehicle, and utilize the vehicle's engine to drive the jump starter's high output alternator.

The use of a high output alternator in conjunction with a large capacitor allows the jump starter to use longer jumper cables. When the capacitor is used in conjunction with an alternator, the resistance in the jumper cables at lengths up to fifty (50) feet can be overcome and provide enough cranking power, roughly 800 amps at 14 volts for 3-5 seconds, to start large vehicle engines. Longer jumper cables mean greater reach and convenience. The high output alternator also allows the capacitors to be quickly re-energize between multiple starting attempts. Consequently, the jump starters of this invention provide a convenient, portable, user-friendly apparatus for starting vehicles without local access to AC power and a superior alternative to DC generator devices, making them well suited for use in fleet applications and for starting vehicles and equipment with large hard cranking engines.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The jump starters embodying this invention deliver a high amperage current flow for starting large vehicles and heavy equipment, but may also be used on smaller vehicles such as passenger cars and are designed and intended for use with standard 3/0 jumper cables of lengths up to fifty feet. Each embodiment of the jump starter includes its own high output (200-300 amp) alternator, a "super" capacitor (a capacitor having capacitance of at least 2000 farads and 120 kilo-joule at 12 volts or 500 Farads and 120 kilo-joules at 24 volts), and microprocessor-controlled, relay-activated, high amperage contactors. When the larger capacitor is used in conjunction with a high output alternator, the resistance in the jumper cables at lengths up to fifty (50) feet can be overcome and provide enough cranking power, roughly 800 amps at 14 volts for 3-5 seconds, to start large vehicle engines. The alternator is also used to maintain the capacitor's charge when the jump charge is not needed and to quickly recharge the capacitor in preparation for repeated start attempts.

In certain embodiments, the jump starter of this invention may configured as a purpose dedicated or "stand alone" machine, which is used to charge and jump start disabled vehicles. In other embodiments, the jump starter is incorporated as part of the multi-purpose machine, which may include other field recovery components and equipment, such as an air compressor, generator, welder and the like. The jump starter may also be integrated directly into a host vehicle where the jump starter uses and shares certain engine and electrical system functions with the host vehicle.

The jump starters of this invention may also be adapted to accommodate the electrical systems of any disable vehicle. In certain embodiments, the jump starter may be specifically designed for use as a dedicated starter for vehicles and equipment using either a 12 volt or 24 volt electrical systems. In the exemplary embodiment illustrated and described herein, the jump starter employs voltage switching circuitry to accommodate vehicle and equipment using either a 12 volt or 24 volt electrical system.

Referring now to the drawings, FIGS. 1-4 show an exemplary embodiment of a jump starter of this invention, which is designated generally as reference number 100. Jump starter 100 is configured as a portable self-contained multi-purpose machine for large vehicle recovery applications. Jump starter 100 functions as both a battery charger and jump booster. In addition, jump starter 100 is a dual voltage system, which is designed to start vehicles having either a 12 volt or 24 volt electrical system.

Figure 1:
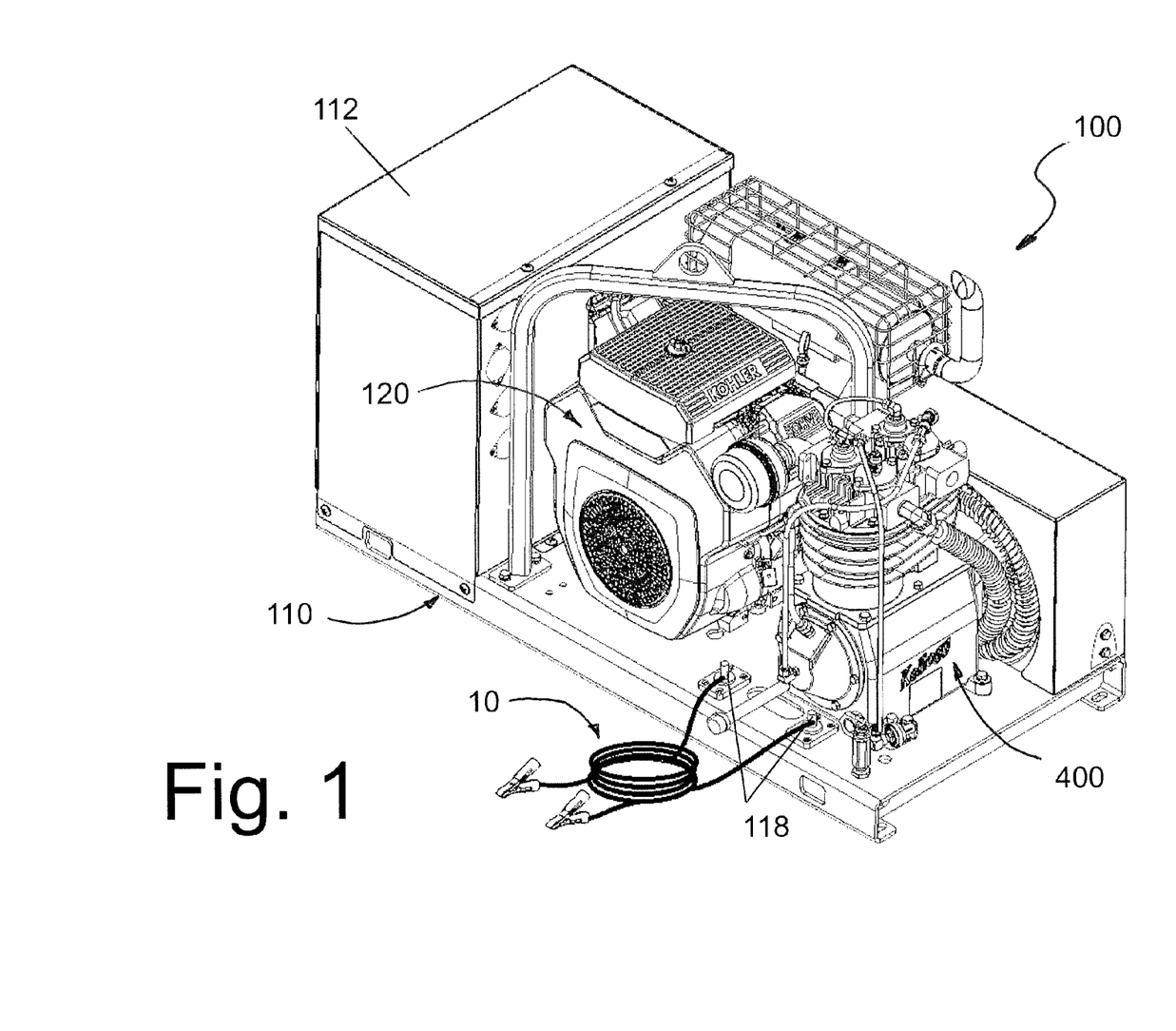
FIG. 1 is a front perspective view of an exemplary embodiment of the jump starter of this invention.
Figure 2:
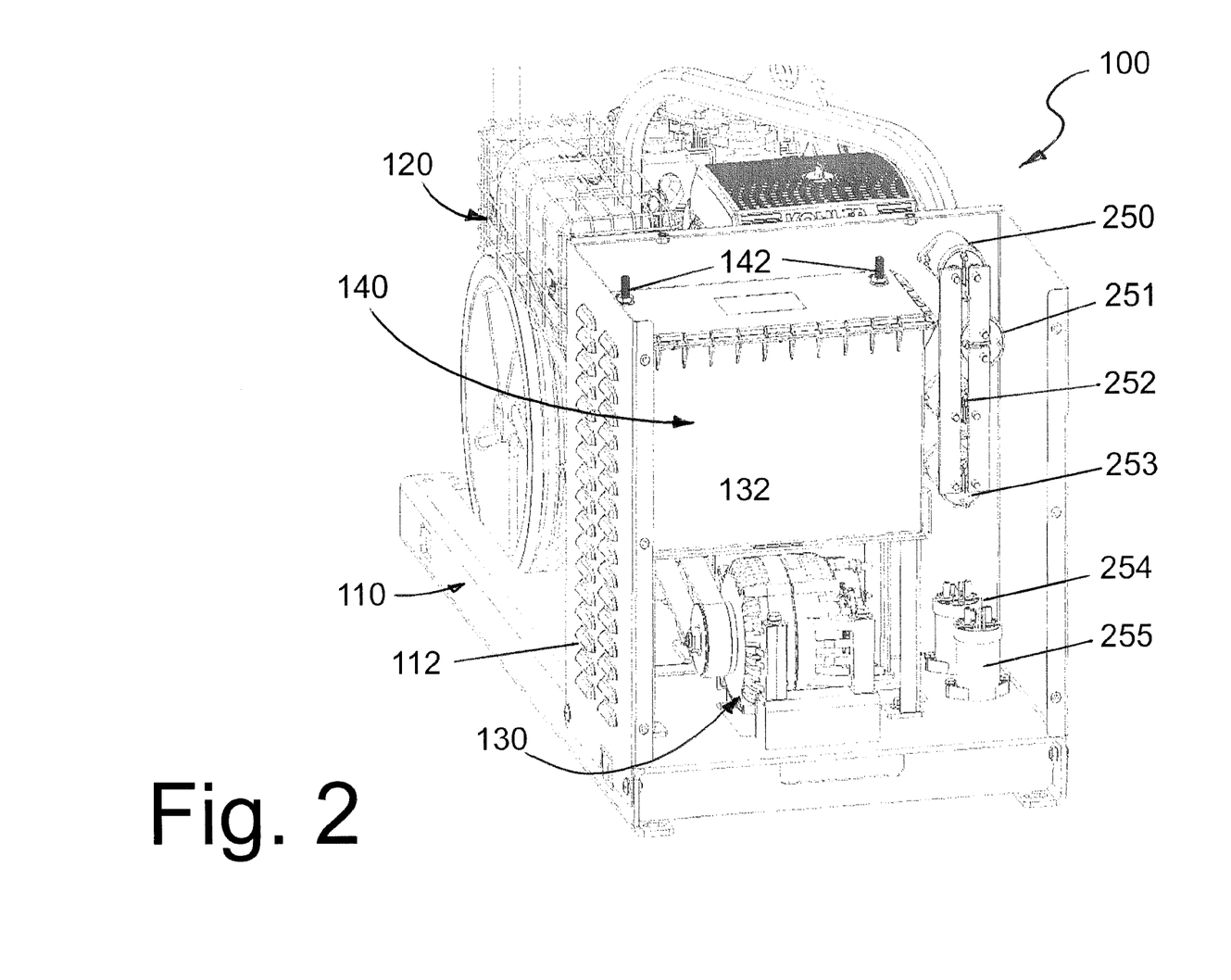
FIG. 2 is a rear perspective view of the jump starter of FIG. 1.
Figure 3:
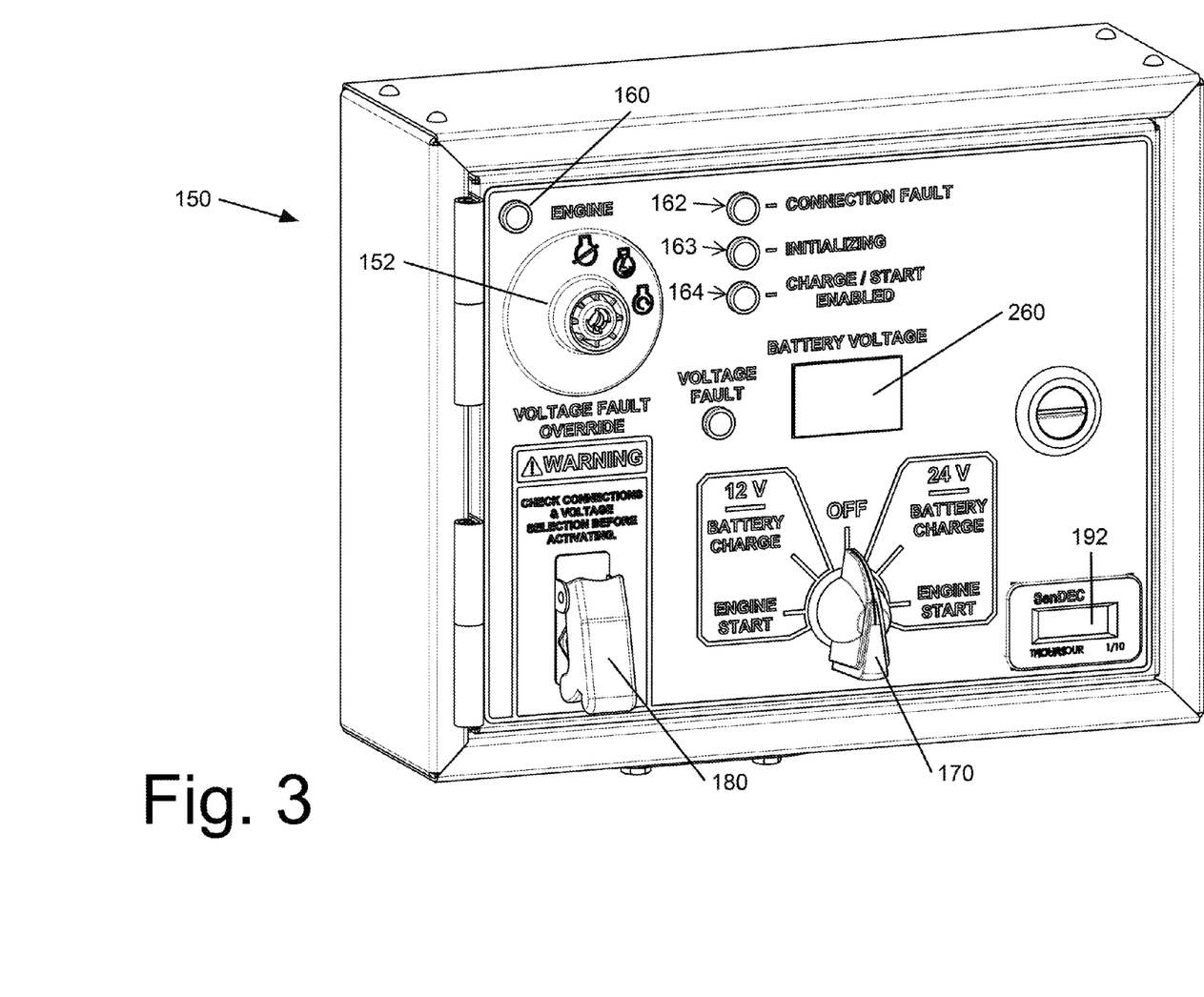
FIG. 3 is a perspective view of the control panel of the jump starter of FIG. 1.

As shown in FIGS. 1-3, jumper starter 100 includes the following main system components and elements: a support frame 110, a small drive engine 120, a high output alternator 130, a 2000 farad (120 kilo-joule) "super" capacitor 140, and a remote control panel 150. Drive engine 120 are mounted atop support frame 110. Control panel 150 is connected to an electrical umbilical cord (not shown) so that the panel may be remotely located from the support frame for operator convenience. In alternative, embodiment, the control panel can be mounted to support frame or integrated into a host vehicle. Alternator 130 and "super" capacitor 140 are enclosed in a separate component housing 112 carried atop support frame 110. Support frame 110 is typically adapted to be portable with a variety of handles and wheels (not shown) as desired for its particular use and application. Support frame 110 includes a pair of jumper cable terminals 118 for attaching jumper cables 10. In addition, support frame 110 typically provides a rack or caddie (not shown) for storing or stowing the coiled jumper cables 10. Jump cables 10 are conventional 3/0 jumper cables 10, well know in the arts. It should be noted that jumper starter 100 is designed and intended to operate optimally with jumper cables 10 generally have a length up to fifty feet.

Figure 4:
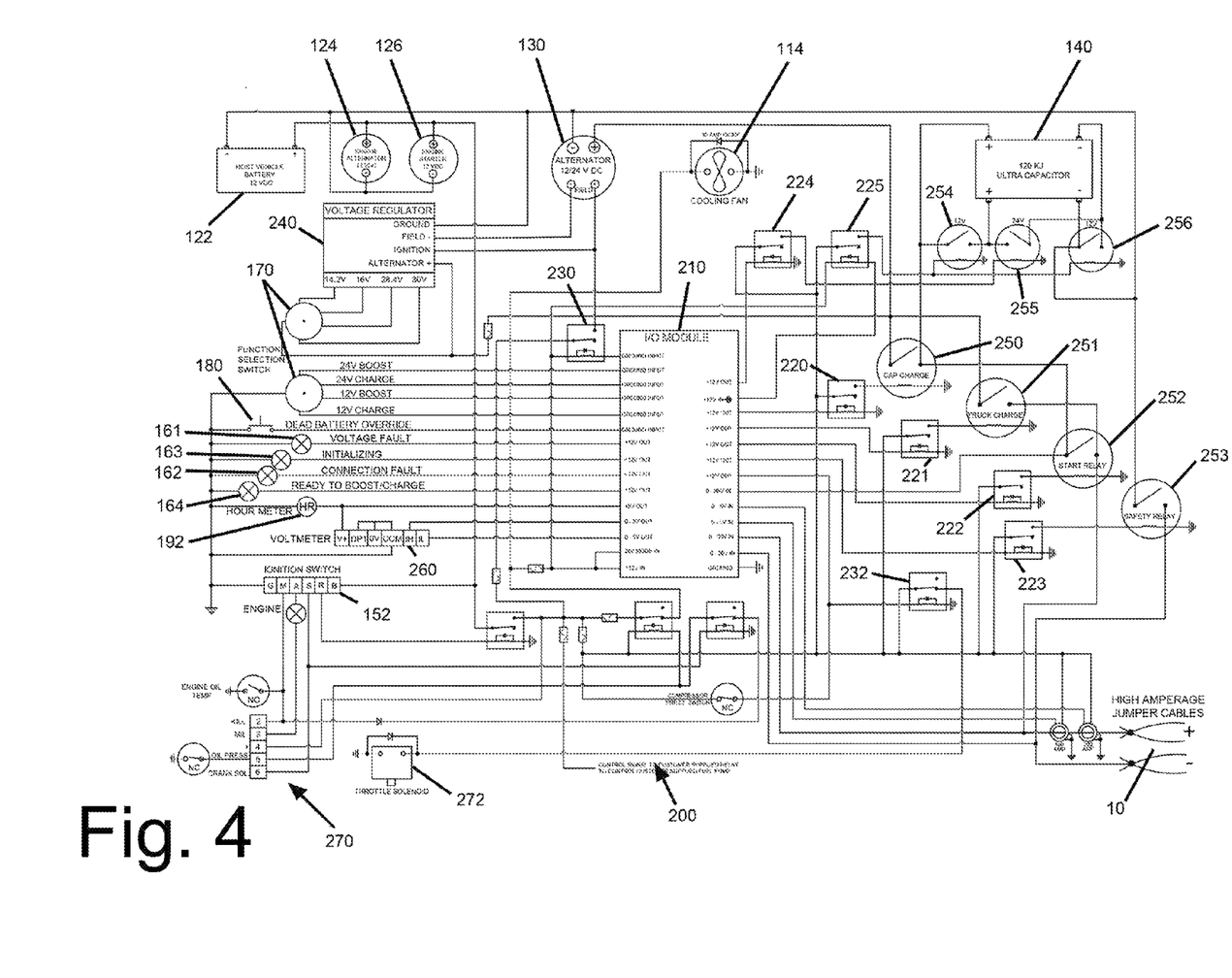
FIG. 4 is an exemplary schematic of a dual 12V/24V electrical control circuitry used in the jump starter of FIG. 1.

Drive engine 120 provides the separate, self-contained power source for jump starter 100 and is used to drive alternator 130. Engine 120 is typically a small gasoline or diesel engine 14-18 horse power, such as those available from Kohler Engines, Co. Drive engine 120 is mounted to support frame 110 and operatively connected to alternator 130 by a drive belt 132. As shown in FIG. 4, drive engine 120 has its own battery 122, engine alternator 124 and starter 126. Drive engine 120 also has its own electrical system and wiring specific to the function of the drive engine, such as electrical subsystem 270 (FIG. 4).

As shown in FIG. 2, alternator 130, super capacitor 140 and certain electrical components of the control circuitry 200 are housed in enclosure 112. Alternator 130 is a conventional high output (200-300 amp) alternator that is used to charge and recharge capacitor 140. As shown, alternator 130 is a "dual mode" 12/24 volt model, which can be selectively switched between a 12 volt or 24 volt mode. Super capacitor 140 is selected to have a capacitance of 2000 Farad (120 kilo-joules) or more. Such high energy "super" capacitors are specialty components available from vendors, such as Kold Ban International, Ltd. Of Lake in the Hills, Ill. Capacitor 140 has a pair of contact terminals 142 (FIG. 1). Electrical wires (not shown) affixed to terminals 142 connect capacitor 140 to the jump starter's control circuitry.

Control panel 150 houses the jump starter's control circuitry, as well as, the various switches, displays and indicator lights of the starter's user interface. Generally, the various switches, displays and indicators used in control panel 150 are generally of conventional design and well known in the art. As shown in FIG. 3, control panel 150 includes a keyed "Engine" switch 152, a four position selector switch 170, and "Low Voltage Override" switch 180. Control panel 150 also includes several condition indicator lights 160-164, a vehicle battery voltmeter display 260, an engine runtime hours display 192, as well as any other instrumentation and operational controls.

Engine switch 152 is a conventional keyed switch that is used to start drive engine 120. All of the indicator lights, selector switches and displays are operatively wired and connected to the jump starter's control circuitry. Selector switch 170 allows a user to manual switch jump starter 100 between the two different operational modes ("Battery Charge" mode and "Vehicle Jump" mode) and two different voltage modes ("12 V" mode and "24V" mode) for each operational mode. Selector switch 170 is a conventional "dial" type, dual-layer electrical switch. Low Voltage Override switch 180 is a toggle switch used to override the "Voltage Fault" safety condition that can occur when trying to charge or jump an extremely discharged battery.

The system indicator lights used in control panel 150 are conventional LED lights and include: an "Engine" indicator light 160, a "Voltage Fault" indicator light 161, a "Connection Fault" indicator light 162, an "Initializing" indicator light 163, and "Charge/Boost Enabled" indicator light 164. Vehicle battery voltmeter display 260 and engine runtime hours display 192 are generally a conventional LCD panel. In other embodiments, the vehicle battery voltage may be displayed on other screens, panels or displays as appropriate for the particular jump starter configuration or application.

FIG. 4 illustrates the electronic control circuitry, designated generally as reference number 200, which controls the operations and functionality of jump starter 100. Due to the high electrical currents needed to charge and jump start large disable vehicles and equipment, control circuitry 200 employs a number of low amperage control relays and high amperage "safety" contactors to electrically isolate and protect control logic components and circuitry from the high current outputs of the alternator 130 and super capacitor 140 within the same electrical system.

Control circuitry 200 includes a programmable electronic controller 210, which stores the control logic and function programming for jump starter 100. Controller 210 is a conventional programmable multi-pin I/O microprocessor. Such programmable microprocessors are commonly used in control circuitry and are well known in the art. Controller 210 governs the operation of jump starter 100 receiving input signals from the users and from voltage and current sensors. The control logic and programming stored within controller 210 uses the input signals to control the function and safe operation of jump starter 100. Controller 210 controls the function of jump starter 100 by activating various high amperage "safety" contactors through various control relays. Controller 210 is also wired to various indicator lights 160-164, which actuate each lights in the event of a particular operational condition based on the control logic and programming.

As shown in FIG. 4, controller 210 is electrically wired to four relays 220-225 and four high amperage "safety" contactors 250-253, which actuate to provide the charging and jump starting functions of jump starter 100. "Cap Charge" relay 220 through safety contactor 250 connects to alternator 130 and super capacitor 140 for charging the super capacitor. "Charge" relay 221 through safety contactor 251 connects alternator 130 to the jumper cables 10 for charging the disabled vehicle. "Start" relay 222 and "Safety" relay 223 through safety contactors 252 and 253, respectively, are connected to alternator 130 and super capacitor 140 to deliver starting current through jumper cables 10 to the disable vehicle.

Control circuitry 200 is configured as a dual voltage system, which allows users to manually switch between a 12 volt mode and 24 volt mode to accommodated disabled vehicles having either 12 or 24 volt electrical systems. The dual voltage function is provided by selector switch 170, a voltage regulator 240, two "voltage switching" relays 224 and 225, and three high amperage contractors 254-256. Voltage regulator 240 is electrically connected to controller 210 through relay 230, which is used to power the regulator on and off. Voltage regulator 240 is also wired to alternator 130 and selector switch 170. Voltage regulator 240 is of conventional design and is selected to have the capacity to output four different user selected voltages. Selector switch 170 allows a user to manually set the output from voltage regulator 240 between four (4) output voltages: "12V Charge" (approximately 14.2 volts); "12V Start" (approximately 16 volts); "24V Charge" (approximately 28.4 volts); and "24 volt Start" (approximately 30 volts). The output from voltage regulator 240 is set at the time the operator selects the function to be performed. As shown, controller 210 is electrically wired to alternator 130 and super capacitor 140 via voltage switching relays 224 and 225 through safety contactors 254-256. Controller 210 initiates relays 224 and 225 activating safety connectors 254-256 to switch between a 12 volt mode and a 24 volt mode. The 12 volt mode is implemented by relay 225 activating safety contactors 254 and 256. The 24 volt mode is implemented by relay 224 activating contactor 255.

Control circuitry 200 further includes a dead battery override switch 180, a voltmeter 260, a drive engine subsystem 270 and an "engine throttle relay 232. Control circuitry 200 also includes various other electronic components, such as resistors, diodes, and fuses, which are not particularly relevant to the design, function or operation of this invention. Such electrical components and their general use in the control circuitry 200 are readily known and understood in the industry.

Dead battery override switch 180 is used to override the "Voltage Fault" safety condition that can occur when trying to charge or jump an extremely discharged battery. If controller 210 detects a vehicle battery voltage that is too low, the controller delivers a "Voltage Fault" condition and lights "voltage Fault LED 161. Dead battery override switch 180 allows the user to temporarily override the "Voltage Fault" condition to give the vehicle battery a chance to accept the output current from jump starter 100 and begin charging. If no current flow is detected through the battery upon releasing the override switch, the "Voltage Fault" condition will return and prevent current flow to the battery. Generally, this override process has a thirty (30) second timeout, but can repeat indefinitely.

An output sensing wire signals to the controller 210 from the battery (not shown) of the disable vehicle or equipment being charged or started. The voltage sensed by controller 210 is displayed on voltage display 260 on control panel 150. Drive engine sub-system 270 is electrically circuitry specific to the control of drive engine 120, which is incorporated into control circuitry 200. Drive engine subsystem 270 may include IC controllers, resistors, diodes, switches, relays, fuses and the like, that provide the various functions and operations of the drive engine, such as electronic fuel injection, engine oil temperature monitors, throttle controls and other engine safety features and functions. Engine throttle relay 232 is wired to a throttle solenoid 272 in drive engine subsystem 270, which allows controller 210 to throttle up engine 120 during charging and jump starting operations.

Jump starter 100 has two user selected operational modes: a "Charge" mode and a "Vehicle Jump" mode. In addition, jump starter 100, as a dual voltage system, has two different voltage modes ("12 Volt" mode and "24 volt" mode) for each operational mode. Jump starter 100 functions similarly in both operational modes for either voltage mode. Users set the desired operational mode and voltage mode for jump starter 10 for the particular application by manually turning selector switch 170 on control panel 150. In the "Vehicle Jump" mode, jump starter 100 is used to start a disabled vehicle with a dead battery. In the "Battery Charge" mode, jump starter 100 is used to charge or recharge a dead battery.

In use in either operational mode, jump starter 100 is first started by manually activating keyed switch 152, which starts engine 120. Starting engine 120, powers up control circuitry 200 with all various relays and components with most relay circuits initially open. Once jumper cables 10 are physically connected between jump starter 100 and the battery of a disabled vehicle or equipment, controller 210 through its control logic and programming automatically checks jumper cables 10 for positive output voltage from the battery of the disabled vehicle. If negative or zero voltage is detected, controller 210 activates "Connection Fault" indicator light 162 on control panel 150 and prevents all relays from being energized. Controller 210 also checks the resistance between the plus and minus jumper connections. If a short or open circuit is detected, controller 210 activates "Connection Fault" indicator light 162, to flash for one (1) second on and 1 second off and prevents all relays from being energized. It should be noted that if any of the above faults are present, the fault must be fixed before the jump starter can be used for either charging or boosting. If no faults are detected, but a zero voltage is still sensed, a user may activate the dead battery override (momentary to ground) using "Low Voltage Override" switch 180, which allows the process to proceed in the "Jump Start" mode. Controller 210 performs a voltage and continuity check every five (5) seconds, to check for proper cable connection, and the cable connection fault light and/or voltage fault light will indicate after each check.

Once started, controller 210 continuously monitors the voltage of super capacitor 140. If the capacitor voltage is less than a certain minimum threshold voltage, generally 13.5 volts in 12 volt mode or 27 volts in 24 volt mode, controller 210 will activate safety contactor 250 through relay 220 to charge capacitor 140. Controller 210 will deactivate contactor 250 every thirty (30) seconds to check the charge of capacitor 140. During this process of charging the capacitor, controller 210 will activate capacitor voltage light 163. When the voltage has reached the threshold voltage, controller 210 will deactivate contactor 250 via relay 220 and "Initializing" indicator light 163 will illuminate. If the capacitor voltage exceeds a maximum threshold voltage, generally 16 volts in the 12 volt mode or 30 volts in the 24 volt mode, controller 210 will activate "Initializing" indicator light 163 to flash for one (1) second on and one (1) second off until the high voltage cause is resolved by the user.

In the "Engine Jump" mode, the following operational steps are initiated by controller 210 through its control logic and programming to enable and perform the "boost" process for starting a disable vehicle. First, controller 210 opens the engine throttle to full engine speed via relay 232 and throttle solenoid 272 and illuminates "initializing" indicator light 163 (Step 1). Next, controller 210 activates "Cap Charge" contactor 250 via relay 220 to begin charging super capacitor 140 (Step 2). Controller 210 continues to charge super capacitor 140 for approximately fifteen (15) seconds or until the capacitor is fully charged, whichever occurs first. During this capacitor charging operation, the other safety contactors remain open or not activated.

Controller 210 monitors the various voltage levels within the control circuitry. If any minimum voltage requirements are not met, controller 210 illuminates "Voltage Fault" LED 161 and disables the charging operation of jump starter 100. If all voltage requirements are met, controller 210 activates "Safety" contactors 253 via relay 223 to check for proper jumper cable connection (Step 3). Controller 201 deactivates the safety contactors terminating the process and illuminates "Connection Fault" indicator 162, if one or both cables are disconnected or if the polarity is reversed.

Once the capacitor voltage is within the minimum and maximum thresholds, and jumper cables 10 are properly connected with continuity and open circuit errors, controller 210 activates "Truck Charge" contactor 251 and "Start" contactor 252 via relays 221 and 222, respectively, beginning the boost process providing voltage from alternator 130 and capacitor 140 through the jumper cables to the vehicle or equipment being started (Step 4). Controller 210 simultaneously reads the amperage from the various current sensors. If current flow through jumper cables 10 is detected, controller 210 will illuminate "Charge/Start Enabled" indicator light 164. If no current to jumper cables 10 is detected, controller 210 will open all safety contactors terminating the process and will illuminate "Voltage Fault" indicator light 161.

At this point, a user may manually override controller 210 using "Low Voltage Override" switch 180 on control panel 150. Low Voltage Override switch 180 triggers controller 210 to close the safety contactors and allow current to flow through to the vehicle battery while the switch is manually held in an attempt to "wake" the dead battery. While Low Voltage Override switch 180 is manually depressed, controller 210 illuminates "Charge/Start Enabled" indicator 164. Low Voltage Override switch 180 may be manually depressed or held for thirty (30) seconds at a time before this function times out. If the battery is successfully awakened, controller 210 will allow the safety contactors to remain closed and "Charge/Boost Enabled" indicator light 164 will remain illuminated once the switch is released and the process continues. If the battery is not successfully awakened, the machine will revert to the "Voltage Fault" condition.

While under boost from jump starter 100, a user turns the key to start the disabled vehicle being jumped (Step 5). Normally, it may take several tries to start the vehicle. Alternator 130 and super capacitor 140 both provide current during this process. Once the vehicle starts (or if it does not due to other issues) the operator will terminate the boost process by turning selector switch 170 to the "Off" position, or disconnecting one or both of the jumper cables.

In the "Charge" mode, jump starter 100 is used to charge or recharge dead batteries of disabled vehicles. The operation of jump starter 100 in the "Charge" mode differs from the "boost" mode only in that controller 210 does not pull current from super capacitor 140. In the "Charge" mode, controller 210 activates "Charge/Boost" light 164 to flash one (1) second on, one (1) second off to indicate "Charge" mode is active.

In the "Charge" mode, the following operational steps are initiated by controller 210 through its control logic and programming to enable and perform the "charge" process for charging a vehicle battery. First, controller 210 activates relay 232 to throttle up drive engine 120 and illuminates "Initializing" indicator light 163 (Step 1). In the "Charge" mode, controller 210 throttles engine 120 to full speed only if it detects that 100 amps is needed to charge the vehicle battery. If less than 100 amperes is needed to charge the vehicle battery, controller 210 maintains engine 120 at a lower speed.

Again, controller 210 monitors the various voltage level within the control circuitry. If any minimum voltage requirements are not met, controller 210 illuminates "Voltage Fault" LED 161 and disables the charging operation of jump starter 100. If all voltage requirements are met, controller 210 activates "Safety" contactors 253 via relay 223 to check for proper jumper cable connection (Step 2). Controller 210 deactivates the safety contactors terminating the process and illuminates "Connection Fault" indicator 162, if one or both cables are disconnected or if the polarity is reversed.

Next, controller 210 activates "Truck Charge" contactor 251 via relays 221 beginning the charge process providing voltage from alternator 130 through the jumper cables to the vehicle or equipment being started (Step 3). Controller 210 simultaneously reads the amperage from the various current sensors. If current flow is detected by the current sensors the machine will move from the "Initializing" state to "Charge/Start Enabled" and battery charging has commenced. Controller 210 will automatically terminate the charging process after forty-five (45) minutes. If no current flow through jumper cables 10 is detected, controller 210 opens safety contactors 251 and 253 terminating the charge process and illuminates "Voltage Fault" indicator light 161. At this point, Low Voltage Override switch 180 may be again used to close safety contactors 251 and 253 and restart the charging process. As in "Vehicle Jump" mode, "Low Voltage Override" switch 180 is used in the "Charge" mode to allow current to flow through jumper cables 10 to the vehicle battery while the switch is held to try to "wake" a dead battery. Again, controller 210 illuminates "Charge/Start Enabled" indicator 164 while Low Voltage Override switch 180 is manually depressed. Low Voltage Override switch 180 may be manually depressed or held for thirty (30) seconds at a time before this function times out. If the battery is successfully awakened, controller 210 will allow the safety contactors to remain closed and "Charge/Boost Enabled" indicator light 164 will remain illuminated once the switch is released and the process continues. If the battery is not successfully awakened, the machine will revert to the "Voltage Fault" condition.

While under charge, jump starter 100 provides current through jumper cables 10 from alternator 130 to the vehicle battery. Once the vehicle battery is fully charged, the charge process can be terminated by moving selector switch to the "Off" position and/or disconnecting jumper cables 10.

Jump starter 100 employs several operational and safety features during the boost and charge processes. Controller 210 through its control logic and programming provides several safety checks to ensure safe and proper connection to the vehicle battery prior to allowing current to flow to the vehicle battery. Operational conditions are indicated by illumination of indicator lights 160-164. Controller 210 checks for proper jumper cable connection to the vehicle battery and will provide protection against, open jumper cables connections, jumper cables being reversed (polarity), and short circuits. Control circuitry also detects if the vehicle battery is capable of receiving a charge.

At any time during the charge or boost process, if the jumper cable connection between jump starter 100 and the vehicle battery is compromised, i.e., a cable comes off of the battery terminal or terminals 118, controller 210 initiates a "Connection Fault" condition deactivating relays 221-225 deactivating safety contactors 251-256 de-energizing jumper cables 10 and illuminates "Connection Fault" indicator light 162. It should be noted that if jumper cables 10 are shorted together, and more than 1100 amps (550 amps for 24 volt mode) is sensed, controller 210 will automatically deactivate relays 221-225 closing safety contactors 251-256 to de-energize boost cables 10. Controller 210 will automatically terminate, i.e. "time out" the boost process after fifteen (15) minutes. If no usage is detected by the amp meter or there is not a momentary voltage drop in excess of 3 volts during the 15 minute period (note 1) in other words no starting load has been placed on the system, jump starter 100 acts as a battery charger. Charge/boost light 164 will then go to flash one second on, one second off. If the operator then wants to boost after this time, the charge switch will need to be cycled to charge, then back to boost.

At any time during use, selector switch 170 can be manually moved into the "Off" position, halting either the charge or boost processes and idling drive engine 120 after five (5) seconds.

As shown, jump starter 100 also includes an air compressor 400 to provide additional functionality. Air compressor 400 is a conventional design and function and is used to provide compressed air for various uses. Air compressor 400 is mounted to support frame 110 and is typically belt driven by engine 120 in the same fashion as alternator 130. Likewise, other embodiments may combine AC generators, pumps and other equipment with the jump starter, which may all be driven by the jump starter's engine.

The use of a high output alternator in conjunction with a large capacitor allows the jump starter to use longer jumper cables. When the capacitor is used in conjunction with an alternator, the resistance in the jumper cables at lengths up to fifty (50) feet can be overcome and provide enough cranking power, roughly 800 amps at 14 volts for 3-5 seconds, to start large vehicle engines. Longer jumper cables mean greater reach and convenience. The high output alternator also allows the super capacitors to be quickly re-energized between multiple starting attempts. The voltage switching circuitry allows the jump starter to be used for vehicles and equipment having either 12 volt or 24 volt electrical systems. The jump starter of this invention can also be adapted as integrated equipment in a utility vehicle, rather than as a separate portable unit. When integrated into a utility vehicle, the vehicle's alternator can be used to charge and recharge the capacitors in place of the separate engine and alternator of a portable unit. Consequently, the jump starters of this invention provide a convenient, portable, user-friendly apparatus for starting vehicles and charging batteries without local access to AC power. As such, the jump starters are well suited for use in fleet applications and for starting vehicles and equipment with large hard cranking engines. The operator need only make the proper connections and select the function, with the charging and boost process performed through the microprocessor controller, the control relays, and the safety contactors.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. In use with jumper cables greater than ten feet in length that are adapted to connect to a battery of a vehicle or other similar equipment having an engine, an apparatus for providing an electrical current to the battery to charge the battery or jump starting the engine, the apparatus comprising:
   a high output alternator having an output amperage above 200 amps for outputting an electrical current to the jumper cables;
   a drive engine operatively connected to the alternator to drive the alternator;
   a capacitor having a capacitance greater than 2000 farads and 120 kilo-joule at 12 volts or 500 Farads and 120 kilo-joules at 24 volts for outputting additional electrical current through the jumper cables;

control circuitry operatively connected to the alternator and capacitor and adapted to connect to the jumper cables for controlling the electrical current from the alternator and capacitor through the jumper cables, the control circuitry includes circuit elements operatively connected to the alternator and the capacitor for charging and recharging the capacitor from the alternator; and a selector switch operatively connected to the control circuitry for manually switching between a jump start mode where the control circuitry provides electrical current from both the alternator and capacitor through the jumper cables and a charge mode where the control circuitry delivers electrical current from the alternator through the jumper cables to jump start the vehicle engine.

2. The apparatus of claim 1 wherein the control circuitry includes a controller operatively connected to the alternator and the capacitor, the controller is a microprocessor having control logic and programming for monitoring and controlling the electrical current outputted from the alternator and the capacitor through the jumper cables.

3. The apparatus of claim 2 wherein the control circuitry includes voltage switch circuitry for selectively delivering electrical current from the alternator and the capacitor through the jumper cables at a first voltage level and a second voltage level.

4. The apparatus of claim 3 wherein the voltage switching circuitry includes a voltage regulator and one or more relays each operatively connected to the controller, the alternator and the capacitor.

5. The apparatus of claim 3 wherein the selector switch is operatively connected to the voltage regulator for manually switching between a first voltage mode where the voltage switch circuitry delivers the electrical current from the alternator and the capacitor through the jumper cables at the first voltage level and a second voltage mode where the voltage switch circuitry delivers the electrical current from the alternator and the capacitor through the jumper cables at the second voltage level.

6. The apparatus of claim 1 wherein the control circuitry includes circuitry elements operatively connected to the drive engine for controlling the speed of the engine.

7. The apparatus of claim 1 wherein the control circuitry includes circuitry elements operatively connected to the jumper cables to detect connection faults with the jumper cables and to terminate the electrical current from the alternator and capacitor through the jumper cables when a connection fault is detected.

8. The apparatus of claim 7 wherein the circuitry elements includes an indicator that illuminates when a connection fault is detected.

9. The apparatus of claim 1 wherein the control circuitry includes circuitry elements operatively connected to the jumper cables, the voltage regulator, the alternator and the capacitor to detect various voltage levels within the control circuitry and to terminate the electrical current from the alternator and capacitor through the jumper cables when the detected voltage levels are outside the predetermined levels.

10. The apparatus of claim 9 wherein the circuitry elements includes an indicator that illuminates when the detected voltage levels are outside the predetermined levels.

11. The apparatus of claim 1 wherein the control circuitry includes circuitry elements operatively connected to the capacitor to detect the voltage level of the capacitor.

12. The apparatus of claim 11 wherein the circuitry elements include an indicator that illuminates when the detected voltage level is above a predetermine voltage level.

13. The apparatus of claim 1 wherein the control circuitry includes a voltmeter for detecting the voltage level of the battery and a display for visually indicating the detected voltage level of the battery.

14. The apparatus of claim 1 and a control panel enclosing the control circuitry, the control panel having a user interface and a plurality of indicator lights corresponding to various operational conditions.

15. The apparatus of claim 14 where the selector switch is mounted to the control panel.

16. The apparatus of claim 15 and an ignition switch mounted to the control panel and operatively connected to the control circuitry and the drive engine for starting the drive engine.

17. The apparatus of claim 1 wherein the control circuitry includes circuit elements operatively connected to the drive engine for regulating the speed of the drive engine.

18. The apparatus of claim 1 and a portable frame supporting the drive engine and a housing mounted to the frame enclosing the alternator and the capacitor.

19. The apparatus of claim 1 and an air compressor operatively connected to the engine.

\* \* \* \* \*